United States Patent [19]

Petrick

[11] 4,005,503
[45] Feb. 1, 1977

[54] WINDSHIELD WIPER BLADE REFILL

[75] Inventor: John T. Petrick, Newtown, Conn.

[73] Assignee: Parker-Hannifin Corporation, Shelton, Conn.

[22] Filed: Sept. 26, 1975

[21] Appl. No.: 617,013

[52] U.S. Cl. .......................................... 15/250.42
[51] Int. Cl.² ....................................... B60S 1/02
[58] Field of Search ................... 15/250.36–250.42

[56] References Cited

UNITED STATES PATENTS

| 2,924,840 | 2/1960 | Anderson | 15/250.42 |
|---|---|---|---|
| 3,099,031 | 7/1963 | Ludwig | 15/250.42 |
| 3,158,890 | 12/1964 | Anderson | 15/250.42 |
| 3,350,738 | 11/1967 | Anderson | 15/250.42 |
| 3,702,490 | 11/1972 | Quinlan et al. | 15/250.42 |
| 3,879,794 | 4/1975 | Roberts, Jr. | 15/250.42 |
| 3,903,560 | 9/1975 | Jewell et al. | 15/250.42 |
| 3,911,523 | 10/1975 | Harbison et al. | 15/250.42 |

Primary Examiner—Peter Feldman
Attorney, Agent, or Firm—Albert C. Johnston; Gerard F. Dunne

[57] ABSTRACT

A windshield wiper blade unit for use with a blade holder, or pressure distributing wiper structure, having a detachable blade-carrying yoke portion comprises a backing member consisting of an extruded elastically resilient strip having a longitudinally hollow central portion slotted along its bottom to receive slidably the head and neck portions of an elastic wiping element and having along its opposite sides laterally open claw-receiving channels defined by flanges which have ridge forming deformations that protrude into the channels to limit movement of the blade unit relative to the claws of the blade holder. Depressed portions of the upper flanges coact with the ridges formed by the deformations. The extruded strip serves also to keep the wiping element in place by virtue of the top wall of its central portion having segments thereof stuck down into the hollow to abut the ends of the wiping element.

9 Claims, 6 Drawing Figures

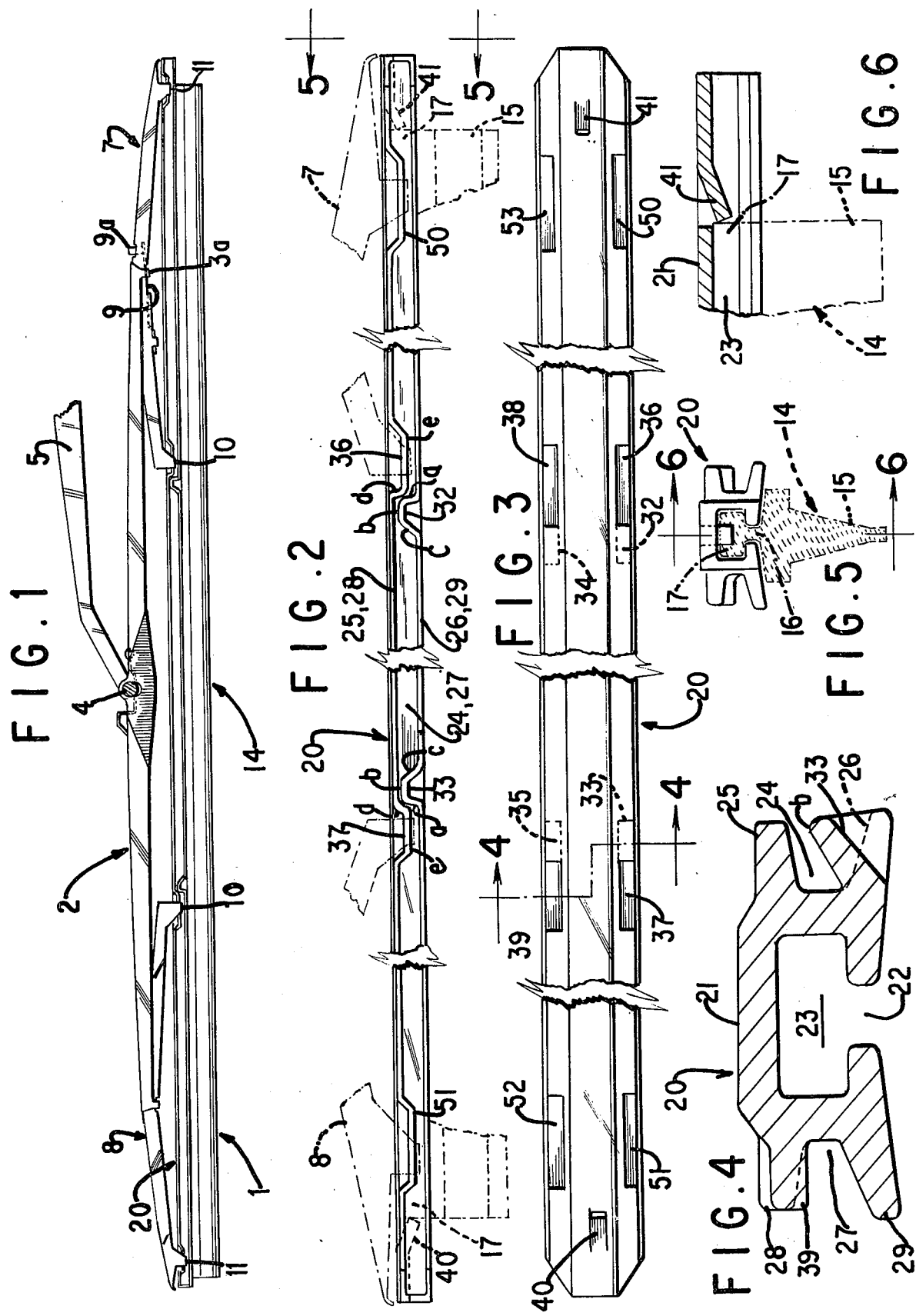

WINDSHIELD WIPER BLADE REFILL

This invention relates to windshield wipers and, more particularly, to an improved wiper blade unit, or blade refill, and the backing member thereof.

Windshield wipers for use on curved windshields typically comprise a pressure distributing wiper structure or blade holder, often termed a "superstructure", which holds and bears against a wiper blade unit through sets of claws carried by yoke portions of the blade holder. The blade unit usually includes a strip-like backing member engaged slidably by the claws and an elastic wiping element held by the backing member.

In a widely utilized type of windshield wiper, for example, as described in U.S. Pat. Nos. 2,897,530 and 3,350,738, the blade holder has two blade-carrying yokes, called "secondary" yokes, which are interconnected by a bridging primary yoke, and at least one yoke is detachable for replacement of a worn blade unit. Blade units made especially for such a holder have detents or shoulders on claw receiving portions of their backing member at locations disposed inwardly of the respective innermost sets of claws on the secondary yokes, to prevent the blade unit from sliding off the holder claws in either longitudinal direction. When either of the secondary yokes is detached, its claws may be slid off one end of the blade unit, and the other end thereof then may be slid off the claws of the other secondary yoke. A new blade unit, or refill, then may be assembled with the blade holder by converse manipulations, followed by reassembly of the detached yoke or yokes.

Wiper blade units have recently been provided which make use of a backing member constituted by an extruded, elastically resilient strip composed, typically, of a thermoplastic resin. Such blade units are described, for example, in U.S. Pat. Nos. 3,879,794 and 3,919,736. The extruded backing member usually has a longitudinally hollow central portion slotted along its bottom to receive slidably therein a head portion and a neck portion, respectively, of the elastic wiping element, and presents along its opposite sides flanges defining laterally open channels which slidably receive the claws of the blade holder.

The known blade units utilizing an extruded backing member have required separately formed, especially assembled attachments for keeping the blade unit in place on the blade holder and for retaining the elastic wiping element in place. Also, they have not been suitable for assembly with a blade holder of the type having a detachable yoke portion in the manner to which servicemen have become accustomed in their work with blade refills made especially for use with blade holders of that particular type.

The principal object of the present invention is to provide a wiper blade unit comprising an economical extruded backing member which is suitable for assembly with a blade holder having a detachable yoke portion in the manner above mentioned and which does not require any attachments for keeping it in working position on the blade holder claws.

Another object of the invention is to provide a backing member for such a blade holder by which the elastic wiping element is also retained securely in place without need for any attachments to the backing member. The invention thus provides a windshield wiper blade refill that is extraordinarily economical to produce.

The windshield wiper blade unit herein set forth is similar to known blade units in that the elastic wiping element comprises longitudinally extending wiping, neck and head portions, while the backing member is constituted by an extruded, elastically resilient strip which has a longitudinally hollow central portion slotted along its bottom to receive slidably the head portion and the neck portion, respectively, of the wiping element and which presents along its opposite sides upper and lower lateral flanges defining laterally open channels to receive slidably, confine and bear pressure from the ends of the claws of the blade holder.

According to the present invention, at least one of the channel-defining flanges of the extruded backing strip has at least one deformation thereof protruding into the channel defined thereby so as to form in the channel a claw-abutting ridge that will limit sliding movement of the strip relative to a claw of the innermost set of claws carried on each of two yoke portions of the blade holder, at least one of which is detachable. Each ridge is formed at a location in the related channel proximate to but inwardly of the normal working position therein of the claw that it is to abut. Typically, each of the channels is provided with two such ridge forming deformations protruding thereinto at respective locations proximate to but inwardly of the working positions of the respective innermost sets of claws of two yokes of the blade holder.

Each of the ridge forming deformations is advantageously a portion of the lower flange defining the related claw channel. Thus, the claw to be abutted, being pressed down against that flange by the yoke structure, will be limited in position by the base of the ridge. Additionally, a portion of the upper flange adjacent to each ridge is depressed into the channel defined thereby to aid in limiting movement of the strip relative to the claws. This depressed upper flange portion advantageously is located outwardly of the related ridge in position to engage over a claw end and confine it to the base of the ridge when the related claw lies adjacent to the ridge.

According to a further feature of the invention, the extruded strip constituting the backing member of the blade unit is made longer than the elastic wiping element received in its hollow central portion, and in the top of this central portion near each end thereof a wall segment is struck downwardly into the hollow to a position where it will abut an end of the head portion of the wiping element. In this way, portions of the extruded strip itself serve to prevent movement of the wiping element out of either end of the strip, and the entire blade unit is composed of but two readily formable parts without need for any attached clip, strip end closure, or other separately formed attachment.

The above mentioned and other objects, features and advantages of the invention will be further evident from the following detailed description and the accompanying drawings of an illustrative embodiment thereof.

In the drawings:

FIG. 1 is a side elevational view of the blade unit assembled for use in a pressure distributing wiper structure;

FIG. 2 is an enlarged side elevational view, partly broken away, of the backing member, or spline, of the blade unit;

FIG. 3 is an enlarged top plan view, partly broken away, of the backing member;

FIG. 4 is an enlarged cross-sectional view taken along line 4—4 of FIG. 3;

FIG. 5 is an enlarged end view thereof, taken at lines 5—5 of FIG. 2; and

FIG. 6 is an enlarged fragmentary cross-sectional view thereof taken at line 6—6 of FIG. 5.

The windshield wiper assembly shown in FIG. 1 comprises a replaceable blade unit 1 according to the present invention, fitted onto a pressure distributing wiper structure, or blade holder, 2. The blade holder includes a primary yoke 3 that can be connected through a coupler 4 to the wiper arm 5 of a motor vehicle, with two secondary yokes 7 and 8 connected pivotably to the ends of the primary yoke to constitute blade-carrying yoke portions of the pressure distributing structure. At least one of the secondary yokes, e.g., the yoke 7, is detachable from other portions of the blade holder in known manner, as by manipulation of the finger piece 9a of a fastening device 9 which connects it detachably with a retaining claw 3a on one end of the primary yoke.

Each secondary yoke carries on its ends inner and outer sets of claws 10 and 11 which slidably engage the backing member 20 of blade unit 1, hold it substantially parallel to the windshield surface, and apply pressure to it, as derived from the wiper arm 5, so as to keep the elastic wiping element 14 of the blade unit in wiping engagement with the windshield surface. While the elastic wiping element may have any of various known forms, in the form shown it is a molded or extruded strip of rubber having a wiping portion 15 of generally V-shaped cross-sectional outline connected longitudinally with a bulbous head portion 17 through a neck portion 16 of reduced width.

The backing member 20 consists of an extruded strip of a stiff resilient material which preferably is a thermoplastic resin characterized by high impact strength and high softening temperature, such as a polycarbonate resin impregnated with carbon black. This strip is formed with a longitudinally hollow central portion 21 having a slot 22 along the bottom thereof, which opens into the hollow 23 therein. The hollow 23 and the slot 22 receive slidably therein, by insertion through either end of the strip, the head portion 17 and the neck portion 16, respectively, of the wiping element 14. Along its opposite sides the strip presents laterally open claw-receiving channels 24 and 27 which are defined between spaced apart upper and lower lateral walls or flanges 25, 26 and 28, 29 formed integrally with the central portion 22 of the extruded strip.

The flanges defining the channels 24 and 27 are sufficiently rigid to receive and guide slidably, confine, and sustain pressure from the several sets of claws 10 and 11 when the ends of these claws are engaged within the channels. The flanges also stiffen the backing strip 20 sufficiently to keep it from flexing transversely in their own plane, while permitting it to flex in the plane perpendicular to the windshield surface under the forces applied through the claws by the pressure distributing wiper structure.

As seen in FIG. 2 in relation to one side of the backing member 20, according to the preferred embodiment of the invention each of the lower flanges 26 and 29 has two deformations thereof protruding into the channel defined thereby so as to form in channel 24 two claw-abutting ridges 32 and 33, and in channel 27 two corresponding claw-abutting ridges 34 and 35. Each of these ridges, as shown in FIG. 1, is formed at a location in the respective channel proximate to but inwardly of the normal working position therein of the end of a claw 10 of the innermost set of claws of one of the blade-carrying yoke portions of the blade holder 2.

The flange deformation forming each of the ridges 32–35 may be produced by cold forming or, if the plastic being used so requires, by heating a local portion of the flange to a temperature that softens the strip material and then pinching the heated portion upwardly into the channel by a tool edge to a height above the medial plane of the channel. As may be seen in FIG. 2, the outward face a of each ridge, which faces toward the nearer end of the backing member, is preferably made steeper than the other face, i.e., at a greater inclination to the inner surface level of the flange, while the other face c of the ridge is sloped gradually from a top b thereof into a curved connection with that surface. The ridge top b may have a width of, for example, nearly 0.1 inch in the axial direction of the strip 20.

As also shown in FIG. 2, each of the upper flanges 25 and 28 has a portion thereof depressed into the channel defined thereby at a location adjacent to but outwardly of each ridge protruding into the same channel. Thus, depressed portions 36, 37, 38 and 39 of the upper flanges are provided in the channels adjacent to, respectively, the ridges 32, 33, 34 and 35 formed by upward deformations of the lower flanges. Each of these depressed portions protrudes downwardly to a location in the related channel where it will engage over and confine to the base of the adjacent ridge the end of a claw 10 of an innermost set of claws of a yoke portion 7 or 8 when that claw end lies next to that ridge. Typically, the inward face d of each of these depressed portions lies nearly parallel to the outward face a of the adjacent ridge and extends to a base e of nearly 0.15 inch in width which is spaced above the inner surface level of the lower flange by a distance of about 0.03 inch. Each depressed portion thus is so located, and it provides sufficient rigidity, that a claw end confined beneath it to the base of the adjacent ridge will firmly abut against the ridge and will not be able to pass over the ridge under any of the conditions to which the blade unit may be subjected while being assembled or when in use on a windshield wiper.

In the case of a backing member made with channels 24 and 27 considerably wider than the thickness of the ends of the blade holding claws, the upper flanges 25 and 28 may be provided with additional depressed portions thereof, as shown at 50, 51, 52 and 58, to overlie and limit the freedom of movement, or play, of the outermost sets 11 of claws of the yoke portions 7 and 8.

As seen in FIGS. 2 and 6, the backing strip 20 is somewhat longer than the wiping element 14 to be received therein. The top wall of the longitudinally hollow central portion 21 has segments 40 and 41 thereof struck downwardly into the hollow 23 of the strip near the opposite ends of the strip. Each of these reaches down into the hollow to a location where its end will abut an end of the head portion 17 of the wiping element and prevent the wiping element from sliding out of the adjacent end of the backing member. Thus, integral struck-down segments of the top wall of the extruded strip 20 keep the elastic wiping element securely in place, while integral deformations of portions of the channel-defining flanges of the same strip keep the blade unit securely in place when it is assembled on the claws of a blade holder having a detachable blade-carrying yoke portion.

I claim:

1. In a windshield wiper blade unit for assembly with a pressure distributing wiper structure that includes blade carrying yoke portions at least one of which is detachable, each said portion having fixed thereto at least one set of claws for receiving and holding slidably the backing member of a wiper blade unit, said blade unit including an elastic wiping element comprising longitudinally extending wiping, neck and head portions and a backing member constituted by an extruded, elastically resilient strip having a longitudinally hollow central portion slotted along its bottom to receive slidably said head portion and said neck portion respectively in the hollow and the slot thereof and presenting along opposite sides thereof upper and lower lateral flanges defining therealong laterally open channels to receive slidably, confine and bear pressure from the ends of said claws, the improvement which comprises at least one of said flanges having a deformation thereof protruding into the channel defined thereby and forming in said channel a claw-abutting ridge at a location proximate to but inwardly of the normal working position therein of a claw of the innermost set of claws on one of said yoke portions, there being at least one said ridge forming deformation in at least one of said channels for limiting sliding movement of said strip relative to a claw of the innermost set of claws of each of said yoke portion, each of said ridge forming deformations being a portion of a said lower flange.

2. A wiper blade unit according to claim 1, at least one of the said lower flanges having two of said ridge forming deformations protruding into the channel defined thereby, each said deformation being proximate to but inwardly of the normal working position of a claw of the innermost set of claws on one of said yoke portions.

3. A wiper blade unit according to claim 1, a portion of the said upper flange at the same side of said strip being depressed into the channel defined thereby at a location adjacent to each said ridge.

4. A wiper blade unit according to claim 3, each said depressed portion being located outwardly of a said ridge in position to engage over and confine to the base of the adjacent ridge and end of a claw of a said innermost set of claws when the latter lies adjacent to such ridge.

5. A wiper blade unit according to claim 1, said strip being longer than said wiping element and having in the top of its said central portion near an end thereof a wall segment struck downwardly into said hollow to abut an end of said head portion and thus prevent movement of said wiping element out of said strip end.

6. A wiper blade unit according to claim 1, said strip being longer than said wiping element and having in the top of its said central portion near each end thereof a wall segment struck downwardly into said hollow to abut an end of said head portion and thus prevent movement of said wiping element out of either end of said strip.

7. In a windshield wiper blade unit for assembly with a pressure distributing wiper structure that includes two blade-carrying yoke portions at least one of which is detachable, each of said portions having fixed thereto at least one set of claws for receiving and holding slidably the backing member of a wiper blade unit, said blade unit including an elastic wiping element comprising longitudinally extending wiping, neck and head portions and a backing member constituted by an extruded, elastically resilient strip having a longitudinally hollow central portion slotted along its bottom to receive slidably said head portion and said neck portion respectively in the hollow and the slot thereof and presenting along opposite sides thereof upper and lower lateral flanges defining therebetween laterally open channels to receive slidably, confine and bear pressure from the ends of said claws, the improvement which comprises each of said lower flanges having two deformations thereof protruding into the channel defined thereby and respectively forming in said channel claw-abutting ridges at spaced apart locations proximate to but inwardly of the normal working positions of claws of the respective innermost sets of claws of said yoke portions, each of said upper flanges having a portion thereof depressed into the channel defined thereby at a location adjacent to but outwardly of each said ridge in the same channel, in position to engage over and confine to the base of the adjacent ridge an end of a claw of a said innermost set of claws when the latter lies adjacent to such ridge, said strip being longer than said wiping element and having in the top of its said central portion near each end thereof a wall segment struck downwardly into said hollow to abut an end of said head portion and thus prevent movement of said wiping element out of either end of said strip.

8. In a windshield wiper blade unit for assembly with a pressure distributing wiper structure that includes blade-carrying yoke portions each having fixed thereto at least one set of claws for receiving and holding slidably the backing member of a wiper blade unit, said blade unit including an elastic wiping element comprising longitudinally extending wiping, neck and head portions and a backing member constituted by an extruded, elastically resilient strip having a longitudinally hollow central portion slotted along its bottom to receive slidably said head portion and said neck portion respectively in the hollow and the slot thereof and presenting along opposite sides thereof upper and lower lateral flanges defining therebetween laterally open channels to receive slidably, confine and bear pressure from the ends of said claws, the improvement which comprises each of said lower flanges having two deformations thereof protruding into the channel defined thereby and respectively forming in said channel claw-abutting ridges at spaced apart locations proximate to the normal working positions of claws of said yoke portions, each of said ridge forming deformations being a portion of a said lower flange, and a portion of the said upper flange at the same side of said strip being depressed into the channel defined thereby at a location adjacent to but outwardly of each said ridge.

9. A wiper blade unit according to claim 8, said strip being longer than said wiping element and having in the top of its said central portion near each end thereof a wall segment struck downwardly into said hollow to abut an end of said head portion and thus prevent movement of said wiping element out of either end of said strip.

* * * * *